April 20, 1965    J. M. LYONS    3,178,907
UNIVERSAL JOINT
Filed Jan. 21, 1963

United States Patent Office 3,178,907
Patented Apr. 20, 1965

3,178,907
UNIVERSAL JOINT
James M. Lyons, Toledo, Ohio, assignor to Dana Corporation, Toledo, Ohio, a corporation of Virginia
Filed Jan. 21, 1963, Ser. No. 252,784
5 Claims. (Cl. 64—17)

This invention relates to universal joints in general and more specifically to a novel construction of a universal joint.

Cardan or Hooke type universal joints normally comprise a pair of members adapted to be joined for substantially uniform rotary movement and a journal cross drivingly secured to each member in such a manner as to allow free articulation of the members relative to each other. More particularly, the members are each provided with a pair of radially spaced opposed axially extending arms or lugs, while the journal cross is prepared with a central body having projecting therefrom two pairs of opposed radially extending spokes or trunnions disposed in an equal circumferentially spaced relationship.

In the usual construction, the lugs of each member are provided with aligned radially extending cross holes which each receive a trunnion of the journal cross. Surrounding the trunnion and disposed in the cross holes is a cup-shaped bearing race, and an annulus of needle bearings are disposed between the trunnion and the race to provide substantially frictionless rotation therebetween. It is most essential for the proper operation of the universal joint thus described that the journal cross be properly radially centered relative to the members and secured so as not to vary from the central position.

To this end, in the usual prior art methods, the cross holes in the lugs are provided with annular grooves which receive a snap ring in an abutting relationship with the radially outer end of the race. The snap ring maintains the outer end or thrust face of the trunnion in an abutting relationship with the bottom or radially inner portion of the enclosed end of the race, and by positioning the races, properly positions the journal cross relative to the member containing the same.

However, due to the accumulation of machining variations which may occur in the journal cross, the member, the snap ring groove, and the snap ring, a certain tolerance must be provided in locating the snap ring groove; for, if the grooves in the opposed lugs are improperly spaced, the thrust face of the trunnion may be pressed against the bottom of the race leading to undesirable friction. Additionally, the thrust face may be spaced too far from the bottom of the race resulting in end play therebetween so that the journal cross is not properly centered relative to the member. Such a construction is expensive since the snap ring groove must be machined in the cross holes and carefully positioned. Additionally, even if the tolerances are correct so that the thrust face of the trunnion properly abuts the bottom of the race, such a construction is fairly rigid and does not provide means to accommodate impact loads or misalignment between the trunnion and race.

It is, therefore, an object of this invention to provide a means for mounting a bearing race in the cross hole of a universal joint member whereby the usual snap ring and snap ring groove is eliminated.

It is another object of this invention to provide a simple and an inexpensive means for securing a bearing race in the cross hole of a member of a universal joint.

Another object of this invention is to provide such a means whereby variation in machined dimensions do not affect the proper positioning of the journal cross relative to the members of the universal joint.

A further object of this invention is to provide a means for securing a bearing race in the cross hole of a member of a universal joint, which means includes resilient means whereby the bearing race may move resiliently relative to the member containing the same to acommodate misalignment and impact loads.

Other and further objects of this invention will become apparent upon a consideration of the specification in view of the following drawings wherein.

Figure 1:
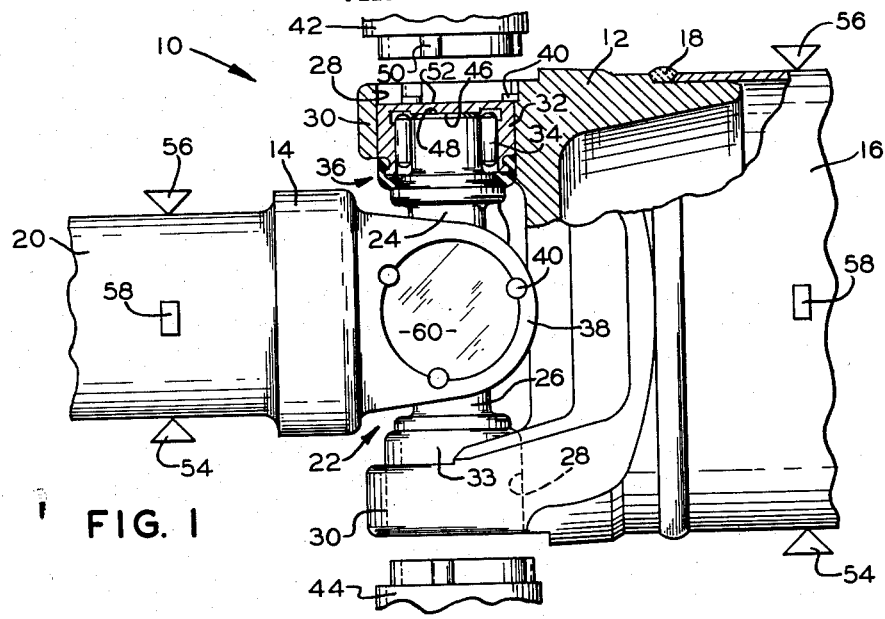
FIG. 1 is a longitudinal elevational view partially in section of a universal joint incorporating this invention and including means for assembling the bearing races therein.

In a preferred embodiment of this invention, a resilient washer or disk having a diameter less than the cross hole is disposed within the cross hole radially outwardly of the bearings so that the washer or disk is between the outer end of the race and the deformed portion of the member, whereby the race is resiliently mounted for radial movement relative to the member.

In another embodiment of this invention, the outer surface of the bearing race is coated with a resilient material. A disk is disposed within the cross hole outwardly of the race so that the resilient material and the disk is between the race and the deformed portion of the member. Resilient material also may be disposed between the periphery of the bearing and the cross hole so that the race is resiliently mounted relative thereto and relative radial movement and misalignment is accommodated.

Referring to the drawings, the universal joint assembly shown generally at 10 includes a pair of yoke members 12 and 14. The yoke 12 is of the ball yoke type and is shown as having been pressed into a section of tubing 16 and secured thereto as by a peripheral weld 18. The yoke 14 has an elongated shaft portion 20 thereon which is adapted for attachment to a suitable element in a drive line (not shown).

A journal cross 22 is provided for drivingly connecting the yokes 12 and 14. The journal cross 22 has a first pair of opposed trunnions 24 and 26 which are disposed in aligned cross holes 28 in the opposed lugs 30 of the yoke 12. Interposed between the trunnions 24 and 26 and the cross holes 28 is a bearing race 32 which engages the wall of the cross hole 28. An annulus of needle bearings 34 are disposed between the trunnion 24 and the inner wall of the bearing race 32 to provide substantially frictionless engagement therebetween. The sealing means shown generally at 36 sealingly engages the open end of the bearing race 32 and the trunnion 24 thereby preventing the ingress of contaminants and the egress of lubricant from within the bearing race 32.

The yoke 14 also has opposed lugs one of which is shown at 38 and is also supported on opposed trunnions of the journal cross 22 which are disposed at 90° from the trunnions 24 and 26. Other details in construction of the bearing race, needle bearings, and seal are identical to that described for the yoke 12.

The bearing race 32, having been positioned in the cross hole 28 of the lug 30, is maintained therein by means of a plurality of deformed portions 40. More particularly, a staking tool, shown fragmentarily at 42 in FIG. 1 and a plan view of which is shown in FIG. 2, is pressed into the opening 28 to position the radially inner thrust face 46 of the bearing race 32 against the radially outer thrust face 48 of the trunnion 24 while simultaneously the projections 50 on the staking tool 42 deform the lug portion 30 adjacent the cross hole 28 therein so as to produce the deformed portions 40 which engage the rear face 52 of the bearing race 32. A staking tool 44 performs a similar function on the bearing race 33 in the cross hole 28 of the other lug 30 of yoke 12.

When performing the above described assembling operation, the tube 16 and the shaft 20 are supported on the underside thereof by means of pilots shown diagrammatically at 54, pilots 56 which support the top side thereof and pilots 58 which support the lateral side thereof whereby the yokes 12 and 14 are properly centralized relative to each other and maintained in this position while the staking tools 42 and 44 press the bearing races 32 and 33 into position thereby centralizing the journal cross 24 relative to the yokes 12 and 14. Similarly, when the bearing races 60 are positioned in the lugs 38 of the yoke 14, the yokes 12 and 14 are also positioned relative to each other so that the journal cross 22 is centralized relative to the yokes 14 and 12 in all planes. It is essential during the pressing and staking operations that the staking tools 42 and 44 move radially inwardly a controlled distance so that the journal cross 22 is properly centrally positioned and that the races are not pressed excessively against the trunnions.

Figure 2:
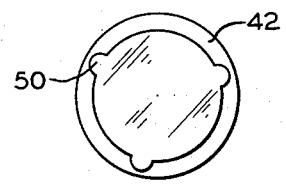
FIG. 2 is a plan view of the deforming tool used to assemble the universal joint of this invention.

In the embodiments of this invention shown in FIGS. 3–6, similar parts will be identified by the same numbers as used for the embodiments shown in FIG. 1. Referring to the embodiment of FIG. 3, the bearing race 32 is positioned in the cross hole 28 of the lug 30 of the yoke shown fragmentarily at 12, and engaging the rear face 52 of the bearing race 32 is a resilient means in the form of a Belleville spring shown at 64 which is disposed in a convex position relative to the bearing race 32. The deformed portions 40 of the lug 30 projecting into the cross hole 28 engage the radially outer portion of the periphery of the Belleville spring 64 thereby pressing the truncated apex of the same against the rear face 52 of the bearing race 32 biasing the inner thrust face 46 of the race against the outer thrust face 48 of the trunnion 24. In this manner, the trunnion 24 and the journal cross 22 and the bearing race 32 may move radially relative to the yoke 12 in a resilient manner by deflecting the Belleville spring 64, whereby loadings therebetween are resiliently accommodated. The Belleville spring 64 when flattened must have a diameter less than the diameter of the cross hole 28 so that when the Belleville spring is compressed or flattened the periphery thereof does not engage the wall of the cross hole and interfere with the resilient action thereof.

Figures 3, 4:
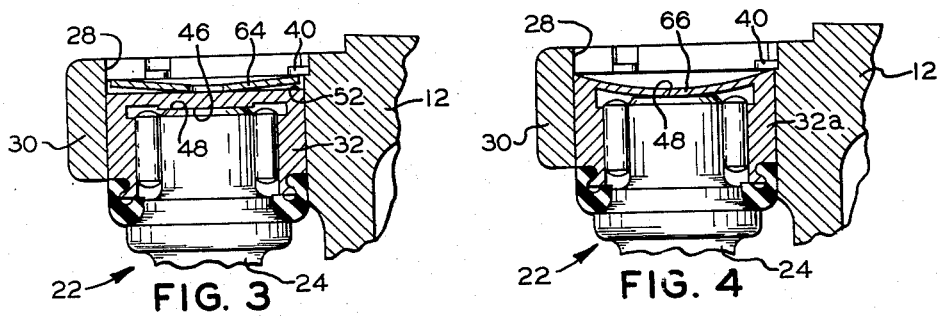
FIG. 3 is a portion of a universal joint assembly shown in section illustrating another embodiment of this invention.
FIG. 4 is a portion of a universal joint assembly shown in section illustrating yet another embodiment of this invention.

In the embodiment shown in FIG. 4, the bearing 32a has the radially outer wall 66 thereof deformed convexly relative to the outer thrust face 48 of the trunnion 24 while being positioned against the outer thrust face 48 by means of the deformed portions 40 of the lug 30. In this embodiment, the wall 66 functions in a resilient manner somewhat like the Belleville spring of the embodiment in FIG. 3 so that the trunnion 24 and the journal cross 22 may move in a resilient manner relative to the bearing race 32a and lug 30 of the yoke 12.

Figure 5:
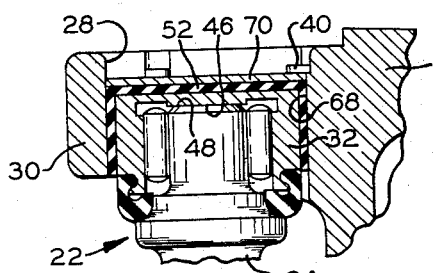
FIG. 5 is a portion of a universal joint shown in section illustrating a further embodiment of this invention.

In the embodiment shown in FIG. 5, the bearing race 32 has the outer walls thereof surrounded by a resilient elastomeric material 68. A disk 70 is positioned in the cross hole 28 of the lug 30 and engages the resilient material 68 disposed at the rear face 52 of the bearing race 32. The deformed portions 40 of the lug 30 engages the radially outer portion of the disk 70 and maintains the disk in abutting engagement with the resilient material disposed between the same and the bearing race 32 thereby biasing the inner thrust face 46 of the bearing race 32 against the outer thrust face 48 of the trunnion 24. In this manner the trunnion 24, the yoke 22, and the bearing race 32, may move radially relative to the lug 30 of the yoke 12 in a resilient manner by compressing the resilient material 68 disposed between the bearing race 32 and the disk 70. Additionally, the resilient material 68 disposed between the side walls of the bearing race 32 and the cross hole 28 allows the bearing race 32 to move relative to the lug 30 thereby accommodating misalignment between the bearing race 32 and the bearing race 33 in the other lug 30 of the yoke 12.

Figure 7:
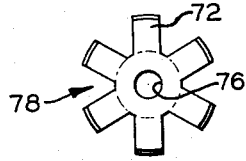
FIG. 7 is a view of a resilient means for use in the embodiment of this invention shown in FIG. 6.
Figure 6:
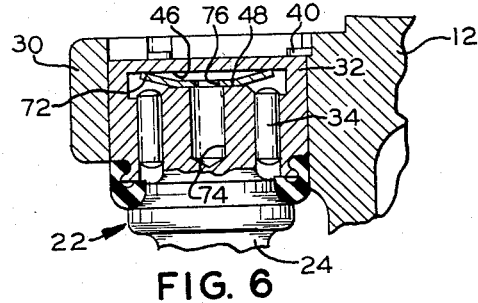
FIG. 6 is a view of a portion of a universal joint shown in section of still another embodiment of this invention.

In the embodiments shown in FIGS. 6 and 7, a resilient means in the form of a Belleville spring 72 is disposed between the inner thrust face 46 of the bearing race 32 and the outer thrust face 48 of the trunnion 24. The Belleville spring 72 is formed convexly relative to the trunnion 24 so that the truncated apex or central portion thereof engages the end of the outer thrust face 48. In this embodiment, the trunnion 24 may be formed with a central radially extending lubricant containing reservoir 74 which, when the universal joint is assembled, is filled with lubricant for continuously supplying lubricant to the interior of the bearing race 32.

The Belleville spring 72 is provided with a central opening 76 in the form of an orifice which meters the lubricant contained in the reservoir 74 as it leaves the same to enter the bearing race 32. The Belleville spring 72 is also provided with a plurality of angularly spaced slots 78 extending from the periphery thereof toward the central opening 76; however, the slots preferably are limited in their inward extension so that they do not extend inwardly past the outer thrust face 48 of the trunnion 24. The diameter of the flattened Belleville spring 72 should be less than the inner diameter of the bearing race 32 so that there is no engagement therebetween to interfere with the resilient action of the Belleville spring. Accordingly, lubricant leaving the reservoir 74 passes through the central opening 76 and then through the slots 78 where the same may intermingle with the annulus of needle bearings 34 and lubricate the engagement thereof with the bearing race 32 and trunnion 24. In this construction, the trunnion 24 and the yoke 22 may move radially relative to the bearing race 32 and the lug 30 in a resilient manner.

The assembly of the embodiments shown in FIGS. 3 through 6 is accomplished in the same manner as that described for the embodiment in FIG. 1 so that the bearing race 32 is maintained in its position relative to the cross hole of the lug containing the same by means of the deformed portions 40 of the lug containing the same.

While several embodiments of this invention have been shown and described, many changes and modifications can be made therein, and it is understood that this description is illustrative only and not for the purpose of rendering this invention limited to the details illustrated or described except insofar as they have been limited by the terms of the following claims.

What is claimed is:

1. In a universal joint the combination comprising a universal joint member having an axis and a pair of opposed axially extending lugs, each of said lugs having a cross hole extending in a radial direction with respect to said axis and the cross holes of both said lugs disposed in aligned relationship, a journal cross having at least a pair of opposed aligned trunnion with each trunnion of said pair of trunnions disposed in one of said cross holes, a cup shaped bearing race means disposed about each of said trunnions and engaging the wall of said cross holes, said bearing race means having an enclosed radially outward portion with the inner face of said outer portion being in a thrusting relationship with the radially outer end of said trunnion, a resilient means disposed in each of said cross holes and engaging the radially outer face of the outer portion of said bearing race, and an integral portion of each of said lugs adjacent the cross hole therein extending into said cross hole and into a pressing relationship with said resilient means thereby resiliently restraining said bearing race means from moving radially outwardly relative to said lug.

2. A universal joint according to claim 1 wherein said resilient means each comprise a deformed disk having a diameter when flattened which is less than the diameter of the cross hole containing the same.

3. In a universal joint as defined in claim 2, wherein said disk is deformed in the shape of a Belleville spring disposed convexly with respect to said bearing race and wherein the deformed portion of said lug engages the radially outward face of said Belleville spring.

4. The universal joint according to claim 1 wherein said resilient means includes resilient elastomeric material engaging the radially outer face of the outer portion of said bearing race and a disk having a diameter less than the diameter of the cross hole containing the same is disposed radially outward of said resilient elastomeric means and wherein the deformed portion of said lug engages the radially outward face of said disk and presses the radially inward face of said disk against said resilient elastomeric material.

5. The universal joint according to claim 4 wherein resilient elastomeric material is also disposed about the periphery of said bearing race engaging the same and the wall of said cross hole whereby said bearing race is resiliently positioned in said cross hole.

References Cited by the Examiner

UNITED STATES PATENTS

| | | |
|---|---|---|
| 1,943,814 | 1/34 | Cutting. |
| 2,141,264 | 12/38 | Cutting. |
| 2,447,882 | 8/48 | Warner. |
| 2,903,868 | 9/59 | Stillwagon. |

FOREIGN PATENTS

| | | |
|---|---|---|
| 874,561 | 4/53 | Germany. |

FRANK SUSKO, *Primary Examiner.*
ROBERT C. RIORDON, *Examiner.*